United States Patent
Neaux

(10) Patent No.: US 6,817,500 B2
(45) Date of Patent: Nov. 16, 2004

(54) ROOF-RACK BAR FOR AUTOMOBILE VEHICLES INTENDED TO BE MOUNTED ON NON-PARALLEL SIDE RAILS

(75) Inventor: Jean-Claude Neaux, Terves (FR)

(73) Assignee: Wagon Automotives SNC, Bressuire Cedex (FR)

( * ) Notice: Subject to any disclaimer, the term of this patent is extended or adjusted under 35 U.S.C. 154(b) by 80 days.

(21) Appl. No.: 09/993,026

(22) Filed: Nov. 14, 2001

(65) Prior Publication Data

US 2002/0066760 A1 Jun. 6, 2002

(30) Foreign Application Priority Data

Nov. 14, 2000 (FR) .............................................. 00 14663

(51) Int. Cl.[7] .................................................. B60R 9/00
(52) U.S. Cl. ....................... 224/321; 224/322; 224/323; 224/330; 224/331
(58) Field of Search ................................ 224/321–323, 224/330, 331, 370, 319, 334

(56) References Cited

U.S. PATENT DOCUMENTS

| | | | |
|---|---|---|---|
| 5,071,050 A | | 12/1991 | Pudney et al. |
| 5,456,512 A | * | 10/1995 | Gibbs et al. ................ 296/37.7 |
| 5,715,980 A | * | 2/1998 | Blankenburg et al. ....... 224/321 |
| 5,732,864 A | * | 3/1998 | Stapleton ..................... 224/321 |
| 5,758,810 A | | 6/1998 | Stapleton |
| 5,826,766 A | * | 10/1998 | Aftanas ....................... 224/321 |
| 5,833,103 A | * | 11/1998 | Rak ............................ 224/321 |

FOREIGN PATENT DOCUMENTS

| | | | | |
|---|---|---|---|---|
| DE | 30 43 970 | | 7/1982 | |
| DE | 88 04 994 | | 8/1988 | |
| DE | 42 23 899 | | 1/1994 | |
| EP | 664 241 | | 7/1995 | |
| EP | 1 093 971 | | 4/2001 | |
| FR | 0694441 A1 | * | 6/1995 | |
| WO | WO 89/04775 | * | 6/1989 | .................. 224/331 |

* cited by examiner

Primary Examiner—Lee Young
Assistant Examiner—Maerena Brevard
(74) Attorney, Agent, or Firm—Merchant & Gould P.C.

(57) ABSTRACT

The invention relates to a roof-rack bar for automobile vehicles comprising a transverse bar and two fastening feet mounted at the ends of the transverse bar. The feet operate in conjunction with side rails mounted on an automobile vehicle, wherein the feet can slide along the side rails during adjustment. The angle between the transverse bar and each of the side rails remains substantially constant when the bar is displaced. At least one of the feet includes a housing in which one end of the transverse bar can slide between two extreme positions in order to adapt to a variable distance between non-parallel side rails. This housing includes a first locking and reinforcement means capable of operating in conjunction with a second locking and reinforcement means fitted on the transverse bar to immobilize or authorize the displacement of the end of the transverse bar in the housing.

21 Claims, 5 Drawing Sheets

ROOF-RACK BAR FOR AUTOMOBILE VEHICLES INTENDED TO BE MOUNTED ON NON-PARALLEL SIDE RAILS

The field of the invention is that of roof-racks for automobile vehicles. More precisely, the invention concerns roof-rack bars intended to be mounted on side rails or tracks provided for this purpose on the vehicle.

These types of system are generally intended to equip the roof of vehicles, for example estate or mini-van type vehicle They can also be mounted on another part of the body, for example the rear trunk or tailgate.

The roofs of vehicles are often provided with one or more predefined locations equipped with means for receiving and fastening the feet of the roof-rack bar.

An improvement to is technique has been proposed that consists in equipping tile roof with two parallel side rails that are perpendicular to the roof-rack bars to enable the latter (or at least one of them) to slide longitudinally on the roof. In particular, this enables at least two positions to be defined:

a working position in which two bars, a front and a rear bar, are on either side of the roof.

a stowed position in which the two bars are brought close to each other, for example such that they define an aerofoil at the roar of the roof.

In the latter configuration the rear bar may be immobile with only the front bar sliding along the side rails.

In this type of situation it is possible to define roof-rack bars suited to vehicles, both in terms of their appearance and their air resistance. The feet of the roof-rack bar can be formed directly in the axis of the transverse bar, streamlined and in the game material and/or same color as the body.

It is not however, always possible to provide longitudinal side rails that are parallel on the roof. In this event bars of different lengths are generally used that are each installed in a predefined, single, fixed position.

Older-style structures of roof-rack bars also be resorted to in which at least one of the feet slides along the transverse bar to enable the distance between the two feet to be modified.

This technique presents a number of drawbacks. Firstly, the ends of the transverse bar of the roof-rack bar can no longer be positioned in the actual axis of the feet because the position of said feet must be capable of varying along the transverse bar. The ends therefore extend above the feet, which is unacceptable by today's standards of appearance, Furthermore, this type of roof-rack bar is very impractical in term of handling, particularly by a single person. In order X modify the position of the roof-rack bar the person must:

unlock both feet on either side of the vehicle;

displace the roof-rack bar, generally in several movements, moving around to the opposite side of the vehicle each time:

adjust the position of at least one of the feet to the new distance between the side rails;

lock both feet onto the side rails.

The production of roof-rack bar mechanisms, the length of which can vary, has also been envisaged that implements articulations on each foot associated with sliding means. This approach is, for example, described in European patent EP-0 664 241.

This technique is attractive in theory but presents several drawbacks in practice. The presence of sliding means and articulations requires a minimum of play which can lead to:

play even when the bar is in the locked position on the roof, particularly when the bar is loaded, therefore making the assembly unsafe;

vertical compression and/or traction play when the roof-rack is loaded and therefore a reduced maximum load;

rapid deterioration of the assembly and particularly the sliding means and articulations becoming jammed or broken;

difficulty in positioning the bar correctly once it has been displaced.

Moreover, and in addition to the weaknesses listed above, the large number of mobile components, and therefore the degrees of freedom, result in the roof-rack being complicated to produce (number of parts, assembly, maintenance, etc.) and consequently a high production cost.

Finally, this technique needs successive handling of each foot requiring the user to move back and forth between the opposite sides of the vehicle to unlock, displace and lock each foot.

The aim of the invention is to overcome these various drawbacks of the background art.

More precisely, one aim of the invention is to provide a roof-rack bar that can be easily displaced along two, non-parallel side rails by a single person who remains on one side of the vehicle.

In other words, one aim of the invention is to provide a roof-Tack bar that does not require complex and/or many handling operations to displace it along the side rails.

A further aim of the invention is to provide such a roof-rack bar that is effective, safe and capable of bearing a considerable load and that remains reliable over time.

In particular, one aim of the invention is to provide such a roof-rack bar that remains both easy to displace and reliable when a load is installed.

Another aim of the invention is to provide such a roof-rack bar that is suited to today's requirements in terms of appearance, body work and air resistance. For example, one aim of the invention is to enable the roof-rack obtained to be transformed into an aerofoil when it is not in use.

A further aim of the invention is to provide such a roof-rack bar that is relatively simple and inexpensive to produce and assemble arm that complies with tho stresses of loads the roof-rack bar must he capable of bearing.

These aims and others which will become apparent below are achieved using a roof-rack bar for automobile vehicles of the type comprising a transverse bar and two fastening feet mounted at the ends of said transverse bar and lying in the axis of the latter, said feet being provided to operate in conjunction with tho guidance and maintenance side rails mounted on said automobile vehicle and being capable of sliding along said side rails in an adjustment position, the angle between said transverse bar and each of said side rails remaining more or loss constant when the bar is displaced along side rails.

According to the invention at least one of said feet comprises a housing in which one end of said transverse bar can slide between two extreme positions in order to adapt to a variable distance between said side rails, said housing comprising first locking and/or reinforcement means capable of operating in conjunction with second additional locking and/or reinforcement means fitted on said transverse bar to immobilize or authorize the displacement of and end of the transverse bar in said housing.

Contrary to what those skilled in the art might expect, the inventors have verified that it is unnecessary to provide articulations in cash foot to enable a bar to be displaced along non-parallel side rails. This surprising result provides an effective, simple solution to the problem posed by non-parallel side rails or tracks.

A transverse bar of variable length is therefore obtained ("transverse bar" referring to all the parts connecting the two feet), the feet remaining positioned in the axis of the ends of the transverse bar. It is therefore ail advantageous solution both in functional terms and as far as appearance is concerned.

The presence of mobile components that enable parts to slide requires play which weakens the bar. Said bar risks being subjected to traction or compression stresses and of becoming damaged or jamming, for example when under considerable loads.

Means are therefore required to immobilize and reinforce the bar when it is in the working position. The transverse bar is therefore maintained in a given configuration and is held in a fixed, safe position irrespective of the loads it bears or the impact and knocks caused when the vehicle moves.

Advantageously, said second locking and/or reinforcement means fitted on said transverse bar operate when in the locked position in conjunction with said first looking and/or reinforcement means such as to eliminate or reduce the transversal play between said transverse bar and the surfaces of said housing.

Certain possible distortions, and particularly traction or compression, are therefore eliminated from the transverse bar relative to the feet under the effect of a load or its fastening The bar is held firmly and reinforced in the housings.

Furthermore, any possible vibrations, particularly when the bar is not loaded, are considerably reduced.

Advantageously, said first locking and/or reinforcement means comprise at least one male (respectively female) component capable of operating in conjunction with, and of complementing, at least one female (respectively male) component fitted on the transverse bar.

In other words, coupling is implemented between the two components. Many, other techniques can clearly be used to ensure self-immobilization between at least two parts, for example implementing wedges, cams, high pressure, etc. in one particular embodiment, in the locked position said first and second locking and/or reinforcement means therefore constitute a gear system comprising at least one tooth.

In particular, said first and second locking and/or reinforcement means can advantageously comprise at least one rack.

The entire length, and therefore different positions, of the rack offers means capable of operating in conjunction with those provided by the housing to lock and/or reinforce the transverse bar.

In this configuration said rack is transversally mobile (from bottom to top when the bar is on a vehicle roof) relative to the longitudinal axis of the transverse bar.

The rack can therefore be displaced between two positions constituting the locked and unlocked modes in different positions according to variations of the position, i.e. of the length of the transverse bar.

In this embodiment said rack is preferably transversally mobile relative to the longitudinal axis or the transverse bar.

Advantageously, said transverse bar comprises a mobile component capable of sliding along said transverse bar and of operating in conjunction with said rack such that it draws if between the locked and unlocked position, and vice versa.

Said mobile component may advantageously have at least one slope against which one or more support components of said rack are capable of coming to bear.

According to another preferred characteristic of the invention the roof-rack bar comprises at least one means for actuating the locking/unlocking of said transverse bar that projects in a recess of said transverse bar or one of said feet.

This control device is advantageously mounted on one of the feet to facilitate use. It can also be provided in the middle of the transverse bar in order for it to be accessed from either side of the vehicle. Another approach is provide a control device on each of said foot either of which may be used. A control device can clearly also be provided on each foot.

Preferably, said actuating moans are coupled to said mobile component via at least one cable running inside said transverse bar, The cable can clearly be replaced with one or more rods or similar components.

Advantageously, the roof-rack bar of the invention comprises et least one actuating means that act simultaneously
  locking/unlocking said transverse bar in said housing;
  immobilization means fitted on at least one of said fastening feet such that they authorize or prevent said feet from being displaced along said guidance side rails.

Advantageously, said, actuating means check the immobilization of the two fastening feet.

This technique is used to change from the "immobilize bar" to the "mobile bar" mode and vice versa in a single operation For safety reasons a double control device and/or a lock can also be provided.

In this event said actuating means are preferably fitted onto said feet and said means for immobilizing the opposite foot are connected to said second locking and/or reinforcement means.

According to one particular embodiment said actuating means are connected to said via a first cable to said first or second locking and/or reinforcement means, a second cable connecting said first or second locking and/or reinforcement means to the means for immobilizing said opposite foot.

This solution proves effective and is easily implemented.

A compensating part can be mounted in the axis of said second cable if the travel of the second cable is shorter than that of the first.

In particular, the compensating part can be a spring or any suitable elastic part. It can be mounted near the locking or immobilization means.

The invention also relates to a roof-rack fur automobile vehicles consisting of at least two roof-rack bars at lest one of which is a roof-rack bar of the invention.

According to one particular embodiment one of said roof-rack bars of the invention can be fixed. In this configuration if two bars are sufficient only one is such as that described above.

Advantageously, said roof-rack bars can be grouped together, for example at the rear of the vehicle, to constitute an aerofoil. Means can also be provided to connect them together, particularly when they constitute an aerofoil.

Other characteristics and advantages of the invention will be better understood from the following description of two preferred embodiments. The descriptions are of non-limitative examples and refer to the attached figures where:

FIGS. 1*a* and 1*b* show the general principle of the invention according to which one end of the transverse bar is mobile in the housing provided on the foot;

Figure 5A:
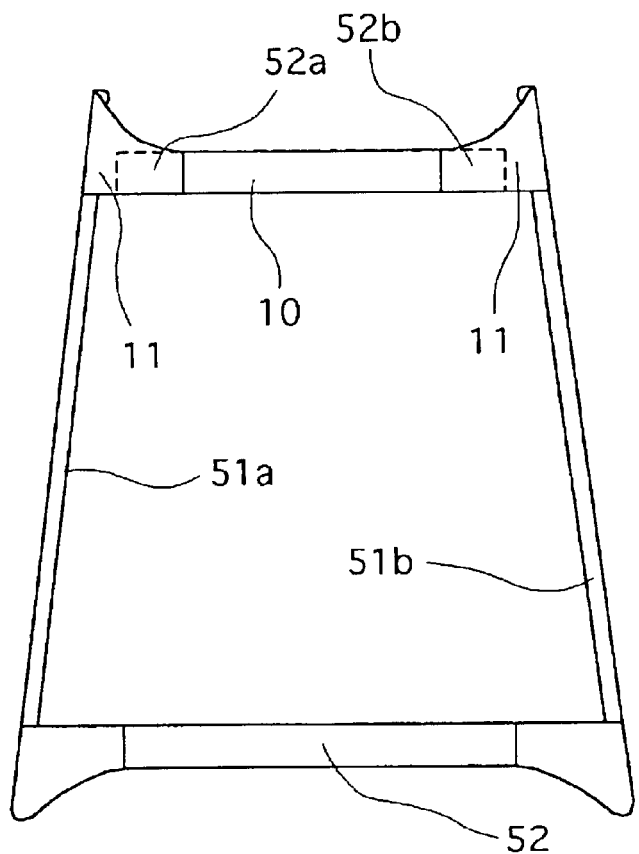
Figure 5B:
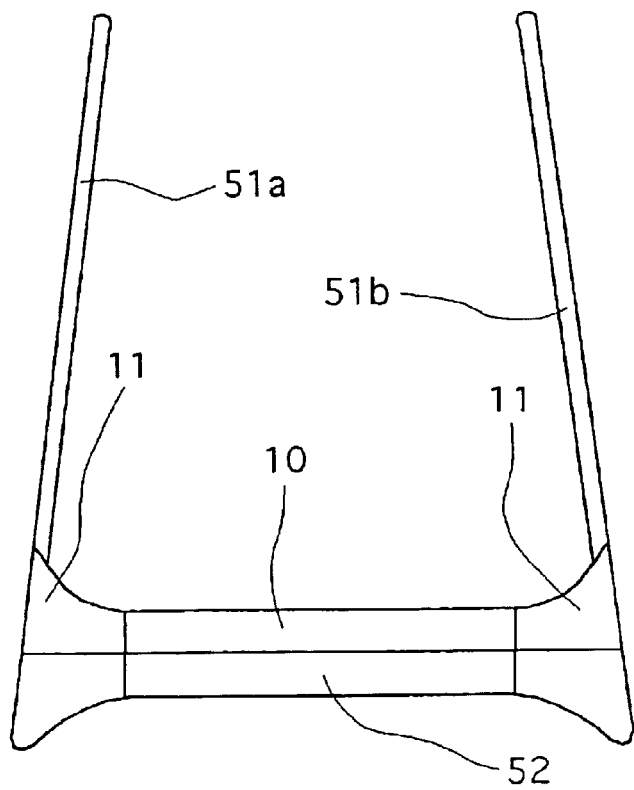

FIGS. 5*a* and 5*b* show the positions that the roof-rack bars of the invention can take up on tho roof of a vehicle equipped with non-parallel side rails.

The invention therefore relates to a roof-rack bar that is mobile along two non-parallel side rails or tracks fitted, for example, on the roof of an automobile vehicle, as shown in FIGS. 5*a* and 5*b*.

Side rails 51*a* and 5*b* are mounted permanently on the roof of a vehicle, These two side rails are not parallel and there may be a difference, for example of 10 centimeter between the widest part (in the present example at the rear of the vehicle but the opposite is also possible) and the narrowest part (the front of the vehicle).

In this example bar 52, which is located at the rear, is fixed (i.e. it does not slide). Only front bar 10 is mobile along side rails 51a and 5b such that it can take up:

a working position (FIG. 5a) in which it is near the front part of the vehicle such that it constitutes a roof-rack with rear bar 52 that can receive various objects to be transported;

a rest position (FIG. 5b) in which it is near rear bar 52 and possibly connected to the latter such that it constitutes an aerofoil.

The invention can also clearly apply to the configuration in which one or more bars are mobile.

As described below, the mobile bar is designed such that ends 52a and 52b of the transverse bar penetrate inside feet 11. It is clearly possible for the system to be implemented on a single foot only.

It should also be noted that FIGS. 5a and 5b are only schematic diagrams and do list comply with criteria of scale or feasibility. The ends of the transverse bar have therefore been enlarged on purpose to provide better understanding of the system of the invention. On the other hand, FIGS. 2 and 3 discussed below are more or less exact.

As specified above, the fact that the side rails are not parallel poses a problem: the length of the transverse bar of the bar must be able to vary.

Those skilled in the art thought his required complex systems to be produced with an articulation between each foot and the transverse bar. The inventors realized that, contrary to this beliefs and somewhat surprisingly, it is unnecessary to provide this type of articulation: means enabling at least one end of tho transverse bar to slide relative to at least one of the feet are sufficient. In other words, tho inventors confirmed that it was possible to enable a displacement of the bar while maintaining a constant angle between the bar and each side rail.

Figure 1A:
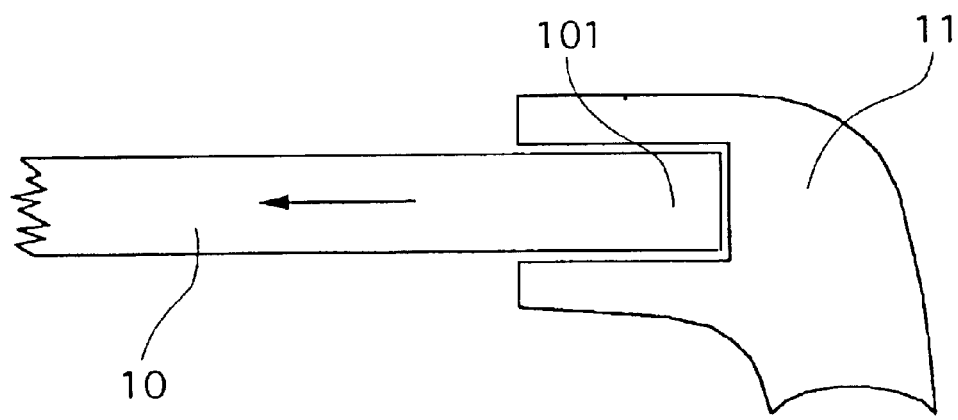
Figure 1B:
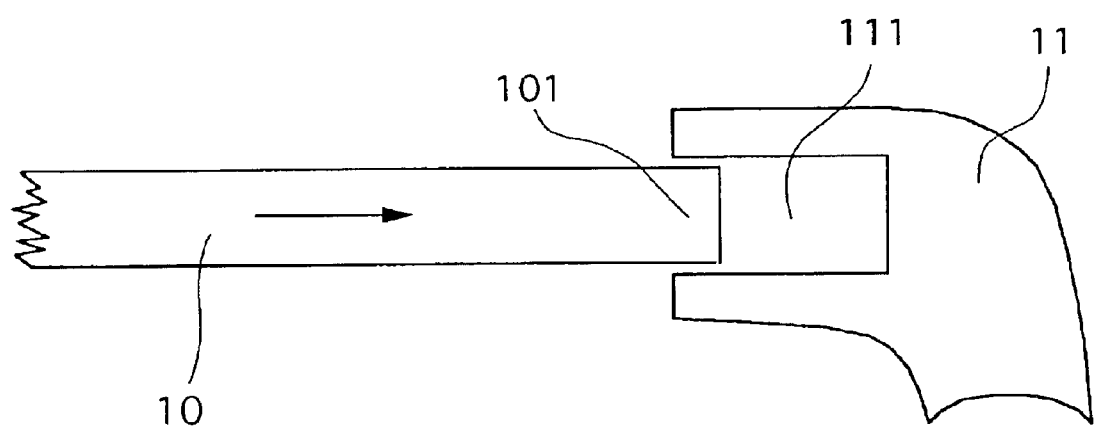

FIGS. 1a and 1b therefore show the general principle of the invention according to which variations are possible in the length of a root-rack bar by enabling it to slide inside at least one of its supports.

For example, end 101 of the body of transverse bar 10 can slide between two extremes in a housing 111 provided for this purpose in foot 11. In this way end 101 remains covered by foot 11, which is advantageous both in terms of appearance and in so far as protecting the mobile components is concerned.

The mechanism can be implemented an a single foot or on both.

Implementation of This type of system is clearly more solid and safer than a system including an articulation while being simpler to implement. It does, nevertheless, require minimum play that enables the transverse bar to move inside the foot and the bar to be displaced.

There is therefore a risk or the system deteriorating with time. Furthermore, depending on the weight, position of the load and the fastening method, the play can weaken the bar. Depending on the configuration the transverse bar is subjected to compression and/or traction stress that may prevent the mechanism from operating correctly.

Furthermore, the transverse bar may gradually sag, for example under the effect of a heavy load, which presents considerable danger.

According to one particular embodiment of the invention locking and/or reinforcement means are therefore provided that immobilize and rigidify the bar when it is in the working position. These means are therefore provided to connect the transverse bar and matching foot effectively. They are reversible means that enable Fe parts to slide without drag in the free position.

The means comprise, for example, at least one male pa part that matched at least one female part and that takes up the working position. Advantageously, they are designed simultaneously to prevent:

the bar from sliding laterally in the foot;

the transverse bar from displacing transversally (i.e. vertically or more or less perpendicular to the plane defined by the roof) in order to resist compression or traction due to a load and fastening of said load.

Figure 2:
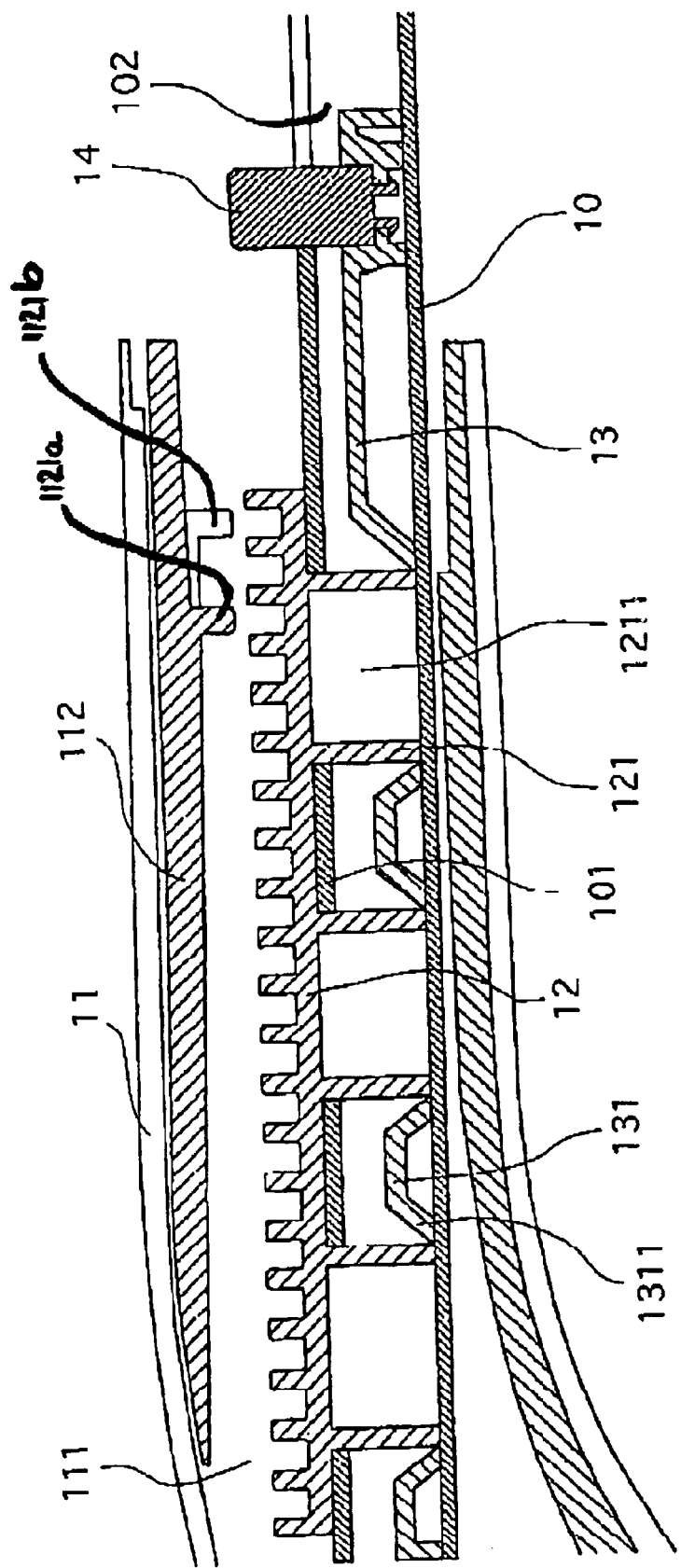
FIGS. 2 and 3 are examples of means for looking the bar in FIGS. 1*a* and 1*b* respectively in unlocked and locked modes.
Figure 3:
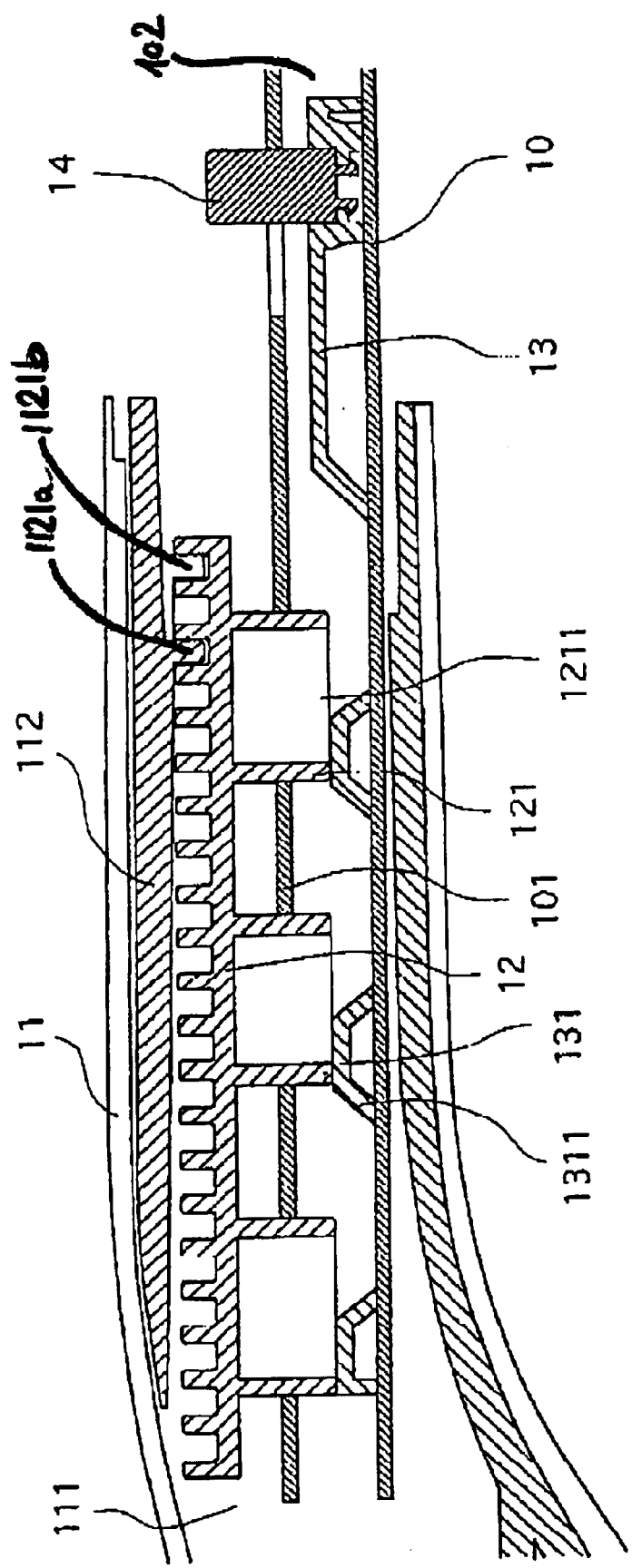

These means can, for example consist of a rack such as that shown in FIGS. 2 and 3.

In these figures transverse bar 10 slides in housing 111 of foot 11.

Said foot 11 comprises first locking and/or reinforcement means, for example a molded part 112 that is inserted and connected, for example by bonding, to the inside of foot 11. Foot 11 could also be molded from a cast onto part 112.

Said part 112 includes teeth 1121a and 1121b separate from each other both along the longitudinal axis and width of housing 111.

Said teeth 1121a and 1121b are intended to mesh with the second additional locking and/or reinforcement means in the form of a rack 12 that defines a series of housings with distance suited to the measurements of tooth 1121a and 1121b.

Rack 12 is, for example, a single molded part and has three feet 121 that are regularly spaced from each other and that define recesses 1211. The rack can also take up two stable positions:

a free position, shown in FIG. 2, in which it is possible for transverse bar 10 to slide relative to foot 11;

a locked position shown in FIG. 3 in which the is system is engaged and prevents sliding and reinforces the foot-transverse bar connection (by eliminating any vertical play).

Rack 12 is therefore transversally mobile in order to change from the position of FIG. 2 to that of FIG. 3 and vice versa. Means actuated by the user are therefore provided to ensure the displacement.

They may, for example, be studs 131 created on a sliding part 13 that have a sloped plane 1311 provided to operate in conjunction with a foot 121 of the rack.

More precisely, in the embodiment illustrated feet 121 of rack 12 are inserted in openings made in the body of the transverse bar. The measurements of recesses 102 are designed to guide the transversal translation of feet 121 of rack 12 without hindering sliding, i.e. by limiting friction with the surfaces of feet 121.

The length of rack 12 is suited to the potential travel of the transverse bar in housing 111. It clearly depends on the requirements and particularly on the required travel, the measurements of rack 12, the number of feet 121 and the number of matching recesses 102 can easily be suited.

A mobile component 13 is inserted in transverse bar 10 that is capable of being displaced along the bottom of transverse bar 10. The width of said mobile component 13 is more or less that of the internal width of transverse bar 10 to obtain satisfactory translation guiding that, nevertheless involves suitable play to prevent any significant friction.

Mobile component 13 has a series of studs 131 with at least one sloped edge 1311, The measurements of said studs enable them to enter or leave recesses 1211 of feet 121 of rack 12.

For example, mobile component 13 can operate in conjunction with rack 12 to draw it into a locked and unlocked position and vice versa.

An actuating component 14 is connected to mobile component 13 that projects into a recess 102 made in transverse bar 10. Actuating component 14 can be displaced by the user along recess 102 between two extreme positions according to which transverse bar 10 is locked in housing 111 (FIG. 3) or unlocked (FIG. 2).

Other actuating modes are also possible, as described below.

The operating stages of such a bar are described in greater detail below.

Working from an initial configuration in which the device is unlocked (FIG. 2), the roof-rack bar can be displace along side rails 51a and 51b to go from a position shown in FIG. 5a a to that shown in FIG. 5b or vice versa.

It should be noted that according to one essential characteristic of the invention the user can displace the roof-rack bar assembly while remaining on a single side of the vehicle.

As the user displaces the roof-rack bar along the side rails the length of the transverse bar varies to suit the distance between the side rails, transverse bar 10 sliding freely in housing 111 of The foot/feet 11, while maintaining a fixed angle with the side rails.

When the bar has reached the required position the user operates actuating component 14 to bring it to the position shown in FIG. 3 in order to lock the device Advantageously, this operation is performed automatically by simply releasing the pressure applied to the actuating component.

As component 14 is connected to sliding part 13 said part and particularly studs 131, is displaced towards the inside of the housing.

Sloped sides 1311 of studs 131 constitute a slope on which feet 121 of the rack come to bear. Rack 12 consequently imposes a displacement upwards. Teeth 122 of the rack then mesh with teeth 1121a and 1121b connected to foot 11.

The locked mode is achieved at the end of this operation. The transversal play in the unlocked mode is then eliminated between, on the one hand, the transverse bar and the various parts it bears and, on the other, the surfaces of housing 11. The transverse bar in the foot housing is therefore reinforced.

The assembly is unlocked symmetrically by opposite kinematics.

Figure 4:
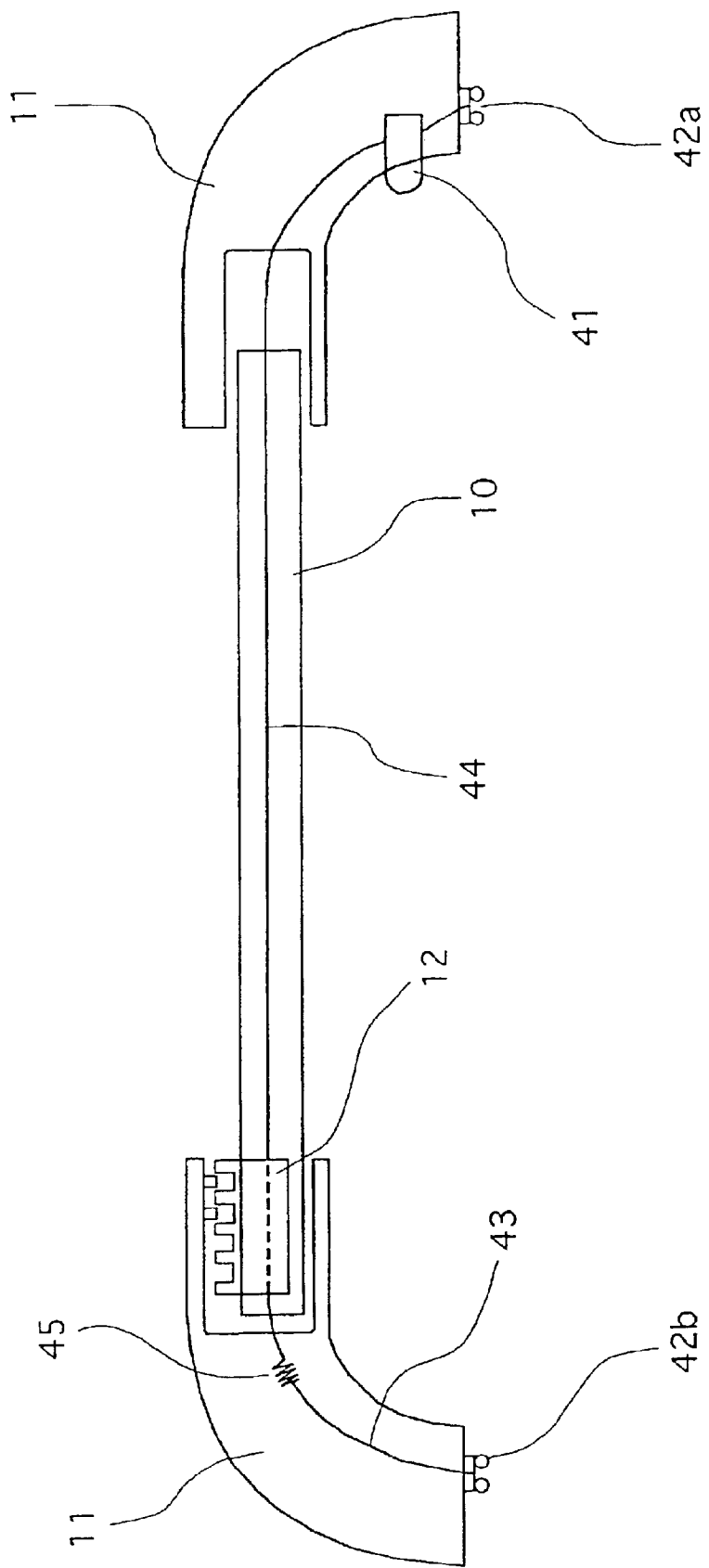
FIG. 4 is a schematic drawing of a control device suited to the locking means in FIGS. 2 and 3.

According to another approach the locking control device may be integrated into one of the feet, for example according to the technique shown in FIG. 4. Advantageously, in this configuration the same control device comes out when the feet are unlocked from the side rails. Therefore the working position (immobilized bar) can be changed to the free position (mobile bar) using a single control device and in a single operation.

Preferably, the control device returns to the working position automatically. In this event it is necessary to maintain the control device in the actuated position in order to displace the bar.

All the parts return to the working position as soon as the control device is released.

The location of the control device further simplifies the implementation of the invention by enabling the user to remain on the same side of the vehicle for all the operations.

In the example of FIG. 4, an actuating component 44 is housed inside one of the feet. It acts on parts 42a that enable the bar to be displaced in the matching side rail. Said parts may, for example, be rollers.

Simultaneously, actuating component 44 acts on a cable 41 that runs inside transverse bar 10 through to sliding part 13 (or a similar part) and that enables the rack to change from the position in FIG. 3 to that in FIG. 2.

A second cable 43 is provided to act on parts 421 of the other foot. Said cable 43 is connected to sliding part 13 that communicates the action of first cable 41.

It is possible for the travel intended to displace the rack and to unlock parts 42b to be different (the second travel in general being shorter). A compensating part 45 is therefore provided, consisting for example of a spring or an elastic part such that the second travel is reduced.

The cables can clearly be replaced by other means of transmission, for example rods.

Even though a roof-rack has been described that is intended to equip the roof of a vehicle he same device can be mounted on any suitable location on the vehicle, for example the rear trunk or tailgate.

On a roof-rack it is not compulsory for all the bars to be such as those described above. In particular, a fixed bar can be provided, particularly at the rear of the vehicle, and a mobile bar that connects with the fixed bar to constitutes an aerofoil.

On the contrary, there may be more than two bars if necessary due to the length to cover and/or the load to bear.

What is claimed is:

1. Roof rack bar for automobile vehicles comprising a transverse bar and two fastening feet mounted at the ends of said transverse bar and lying in the axis of said transverse bar, said feet being provided to operate in conjunction with guidance and maintenance side rails mounted on said automobile vehicle and being capable of sliding along said side rails in an adjustment position, the angle between said transverse bar and each of said side rails remaining substantially constant when the bar is displaced along side rails, wherein at least one of said feet comprises a housing in which one end of said transverse bar can slide between two extreme positions in order to adapt to a variable distance between said side rails, said housing comprising first locking and reinforcement means adjacent said transverse bar and capable of operating in conjunction with second complimentary locking and reinforcement means, wherein said second locking and reinforcement means extends inside said transverse bar to immobilize or authorize the displacement of said end of the transverse bar inside said housing, said second locking and reinforcement means is movable to engage said first locking and reinforcement means.

2. Roof-rack bar of claim 1 wherein said second locking and reinforcement means fitted on said transverse bar operate in conjunction with said first locking and reinforcement means in the locked position in order to eliminate or reduce the transversal play between said transverse bar and the surfaces of said housing.

3. Roof-rack bar of claim 1 wherein said first locking and reinforcement means comprise at least one male (respectively female) component capable of operating in conjunction with, and of complementing at least one female (respectively male) component fitted on the transverse bar.

4. Roof rack bar for automobile vehicles comprising a transverse bar and two fastening feet mounted at the ends of said transverse bar and lying in the axis of said transverse bar, said feet being provided to operate conjunction with guidance and maintenance side rails mounted on said automobile vehicle and being capable of sliding along said side rails in an adjustment position, the angle between said transverse bar and each of said side rails remaining substantially constant when the bar is displaced along side rails, wherein at least one of said feet comprises a bowing in which one end of said transverse bar can slide between two extreme positions in order to adapt to a variable distance between said side rails, said housing comprising first locking and reinforcement means adjacent said transverse bar and capable of operating in conjunction with second complimentary locking and reinforcement means, wherein said second locking and reinforcement means extends inside said transverse bar to immobilize or authorize the displacement of said end of the transverse bar inside said housing, said second locking and reinforcement means is movable to engage said first locking and reinforcement means, and whereby a locked position said first and second locking and reinforcement means constitute a gear system comprising at least one tooth.

5. Roof rack bar for automobile vehicles comprising a transverse bar and two fastening feet mounted at the ends of said transverse bar and lying in the axis of said transverse bar, said feet being provided to operate in conjunction with guidance and maintenance side rails mounted on said automobile vehicle and being capable of sliding along said side rails in an adjustment position, the angle between said transverse bar and each of said side rails remaining substantially constant when the bar is displaced along side rails, wherein at least one of said feet comprises a housing in which one end of said transverse bar can slide between two extreme positions in order to adapt to a variable distance between said side rails, said housing comprising first locking and reinforcement means adjacent said transverse bar and capable of operating in conjunction with second complimentary locking and reinforcement means, wherein said second locking and reinforcement means extends inside said transverse bar to immobilize or authorize the displacement of said end of the transverse bar inside said housing, said second locking and reinforcement means is movable to engage said first locking and reinforcement means, and wherein said first and second locking and reinforcement means comprise at least one rack.

6. Roof-rack bar of claim 5 wherein said rack is transversally mobile relative to the longitudinal aids of the transverse bar.

7. Roof-rack bar of claim 5 wherein said transverse bar comprises a mobile component capable of sliding along said transverse bar and of operating in conjunction with said rack such that it draws it between the locked and unlocked position and vice versa.

8. Roof-rack bar of claim 7 wherein said mobile component has at least one slope against which one or more support components of said rack are capable of coming to bear.

9. Roof-rack bar of claim 1 wherein it comprises at least one means for actuating the locking/unlocking of said transverse bar that projects into a recess of said transverse bar or one of said feet.

10. Roof-rack bar of claim 9 characterized in that said actuating means are coupled to said mobile component via at least one cable running inside said transverse bar.

11. Roof rack bar for automobile vehicles comprising a transverse bar, two fastening feet mounted at the ends of said transverse bar and lying in the axis of said transverse bar, and at least one actuating means, wherein said feet being provided to operate in conjunction with guidance and maintenance side rails mounted on said automobile vehicle and being capable of sliding along said side rails in an adjustment position, the angle between said transverse bar and each of said side rails remaining substantially constant when the bar is displaced along side rails, wherein at least one of said feet comprises a housing in which one end of said transverse bar can slide between two extreme positions in order to adapt to a variable distance between said side rails, said housing comprising first locking and reinforcement means adjacent said transverse bar and capable of operating in conjunction with second complimentary locking and reinforcement means, wherein said second locking and reinforcement means extends inside said transverse bar to immobilize or authorize the displacement of said end of the transverse bar inside said housing, said second locking and reinforcement means is movable to engage said first locking and reinforcement means, and said actuator means acts simultaneously on:
locking/unlocking said transverse bar in said housing;
immobilization means fitted on at least one of said fastening feet such that they authorize or prevent said feet from being displaced along said guidance side rails.

12. Roof-rack bar of claim 11 characterized in that said actuating means control the immobilization of the two fastening feet.

13. Roof-rack bar of claim 12 characterized in that said actuating means are fitted onto one of said feet and that said means immobilizing the opposite foot are connected to said second locking and/or reinforcement means.

14. Roof-rack bar of claim 13 characterized in that said actuating means are connected to said via a first cable to said first or second locking and/or reinforcement means, a second cable connecting said first or second locking and/or reinforcement means to the means for immobilizing said opposite foot.

15. Roof-rack bar of claim 14 characterized in that a compensating part is mounted in the axis of said second cable such that the travel of said second cable is shorter than that of the first.

16. Roof-rack for automobile vehicles consisting of at least two roof-rack bars, wherein at least one of them is a roof-rack bar of claim 1.

17. Roof-rack bar of claim 16 wherein one of said bars is fixed.

18. Roof-rack of claim 16 wherein said roof-rack bars can be grouped together to constitute an aerofoil.

19. Roof-rack bar of claim 2 wherein said first locking and/or reinforcement means comprise at least one male (respectively female) component capable of operating in conjunction with, and of complementing, at least one female (respectively male) component fitted on the transverse bar.

20. Roof-rack bar of claim 6 wherein said transverse bar comprises a mobile component capable of sliding along said transverse bar and of operating in conjunction with said rack such that it draws it between the locked and unlocked position and vice versa.

21. Roof-rack of claim 17 wherein said roof-rack bars can be grouped together to constitute an aerofoil.

* * * * *